United States Patent [19]
Rush

[11] Patent Number: 5,473,804
[45] Date of Patent: Dec. 12, 1995

[54] METHOD OF RELEASING A SPRING RETAINER

[76] Inventor: Mark S. Rush, 358 Pearl St., Steamboat Springs, Colo. 80477

[21] Appl. No.: 276,334

[22] Filed: Jul. 18, 1994

[51] Int. Cl.[6] ................................................. B23P 19/00
[52] U.S. Cl. ........................... 29/426.6; 29/229; 81/426.5
[58] Field of Search .............................. 29/278, 280, 225, 29/229, 426.6; 81/424.5, 426.5

[56] References Cited

U.S. PATENT DOCUMENTS

| | | | |
|---|---|---|---|
| 1,442,486 | 1/1923 | Looke | 81/426.5 X |
| 1,775,022 | 9/1930 | Dodge | 81/426.5 X |
| 1,910,750 | 5/1933 | Clark | 81/426.5 |
| 3,203,221 | 8/1965 | Conner | 29/229 X |
| 5,391,181 | 2/1995 | Johnson et al. | 81/424.5 X |

FOREIGN PATENT DOCUMENTS 878585  1/1943  France ................................ 81/424.5

Primary Examiner—S. Thomas Hughes
Attorney, Agent, or Firm—Klaas, Law, O'Meara & Malkin

[57] ABSTRACT

A first lever and a second lever are hinged to each other by a pivot. Each lever includes a handle at the bottom end and a jaw at the top end. The jaw at the top end of the first lever includes a curved portion and a tip portion, as does the jaw at the top end of said second lever. The pivoting arrangement of the first and second levers is such that the handles are squeezed together to move the respective jaws of the first and second levers together to surround and compress the plurality of fingers on the spring retainer.

1 Claim, 3 Drawing Sheets

METHOD OF RELEASING A SPRING RETAINER

BACKGROUND OF THE INVENTION

1. Field of the Invention

The present invention relates to tools in general and more specifically to tools for compressing spring retainers.

2. Background of the Invention

Spring retainers are used to mount a wide variety of devices, such as cable or hose assemblies, to support brackets or frames. For example, circular spring retainers having a plurality of outwardly biased fingers have been used for decades in the automotive field to retain emergency brake cables and hydraulic hose assemblies, just to name a few. In the case of an emergency brake cable, each end of the cable sheath is fixedly attached to a suitable support bracket which prevents the sheath from moving as the inner cable is actuated. As best seen in FIG. 1, a common emergency brake cable installation may include a flange and spring retainer assembly 12 that is attached to the end of the cable sheath 14. The cable sheath 14 is axially retained by the cooperative action of a flange 16 one side of the support bracket 18 and the outwardly biased fingers 20 of the spring retainer 22 on the other.

The spring retainer 22 shown in FIG. 1 includes a plurality of outwardly biased fingers 20 attached at one end to a support ring 24 which surrounds a mounting boss 28. The other ends of the outwardly biased fingers 20 are unrestrained. The size of the spring retainer 22 is such that the outwardly biased fingers 20 are compressed by the mounting hole 26 in the support bracket 18 to permit the mounting boss 28 and spring retainer 22 to slide through the hole during installation. Once the flange 16 is fully seated against the support bracket 18, the fingers 20 of the spring retainer snap outward, expanding to engage the opposite side of the support bracket 18, thus axially retaining the cable sheath 14.

While the flange and spring retaining assembly 12 shown in FIG. 1 allows for easy assembly, removal of the cable sheath 14 from the support bracket 18 has proven to be a difficult and tedious process, requiring the simultaneous compression of the fingers 20 of the spring retainer 22 while at the same time attempting to slidably remove the assembly from the mounting hole 26. Most mechanics and other persons faced with the task of removing such cable sheath mounting assemblies have had to resort to a number of makeshift measures. For example, many mechanics attempt to disengage the spring retainers by compressing one finger of the spring retainer at a time, trying to get the edge of the finger engaged with the hole in the support bracket to retain it in the compressed position, then proceeding to the next finger, and so on. If the mechanic is skillful and none of the fingers become disengaged while he is attempting to compress and engage the others, he will eventually be able to remove the cable sheath assembly. However, if any of the fingers of the spring retainer become disengaged during the process, he must then go back and re-compress and re-engage the fingers, all while attempting to prevent any other engaged fingers from becoming disengaged. Other mechanics have found it necessary to employ an assistant to help in simultaneously compressing the fingers of the spring retainer and then trying to slide the entire assembly from the support bracket.

SUMMARY OF THE INVENTION

Accordingly, it is a general object of this invention to provide a tool capable of simultaneously compressing a plurality of fingers on a spring retainer.

It is another object of this invention to provide a tool for compressing spring retainers that can be used by one person.

It is a further object to provide a tool capable of simultaneously compressing a plurality of fingers on a spring retainer while also applying an axial force to the spring retainer.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the spring retainer release tool according to this invention may comprise a first lever and a second lever hinged to each other by a pivot. Each lever includes a handle at the bottom end and a jaw at the top end. The jaw at the top end of the first lever includes a curved portion and a tip portion, as does the jaw at the top end of said second lever. The pivoting arrangement of the first and second levers is such that the handles are squeezed together to move the respective jaws of the first and second levers together to surround and compress the plurality of fingers on the spring retainer.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
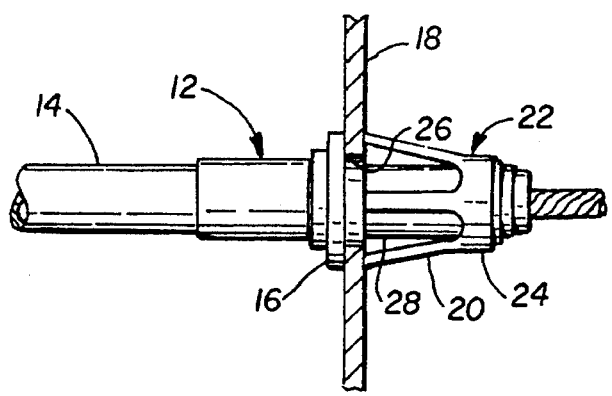
FIG. 1 is a side view in elevation of a typical flange and spring retainer assembly found in the prior art.
Figure 2:
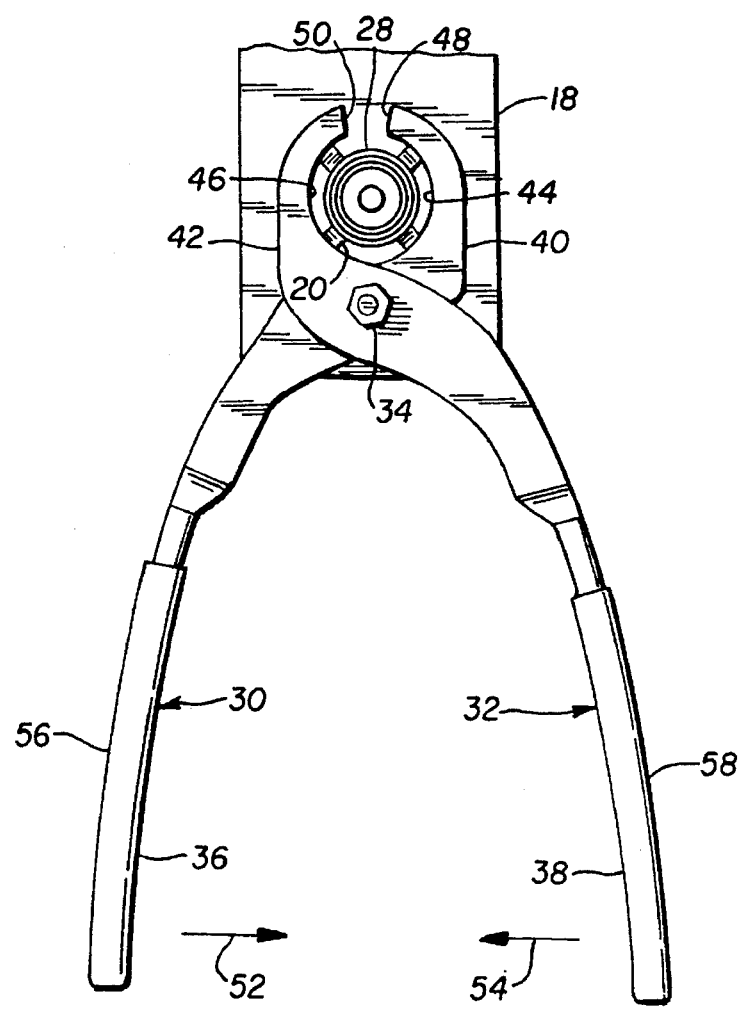
FIG. 2 is a front view of the spring retainer release tool according to the present invention surrounding the uncompressed fingers of a spring retainer.

The spring retainer release tool 10 according to the present invention is best seen in FIG. 2 and comprises a first lever 30 pivotally mounted to a second lever 32 by a pivot pin assembly 34. The first and second levers 30 and 32 include respective first and second handle portions 36 and 38 at the bottom ends and respective first and second jaw portions 40 and 42 at the top ends. The first and second jaw portions 40 and 42 include respective first and second curved portions 44 and 46 that are adapted to engage and compress the fingers 20 of spring retainer 22. The first and second levers 30 and 32 are also adapted so that the respective tip portions 48 and 50 can be opened a sufficient amount to allow the tool 10 to be placed around the fingers of the spring retainer 22 when the fingers are in the extended position shown in FIG. 1.

Figure 3:
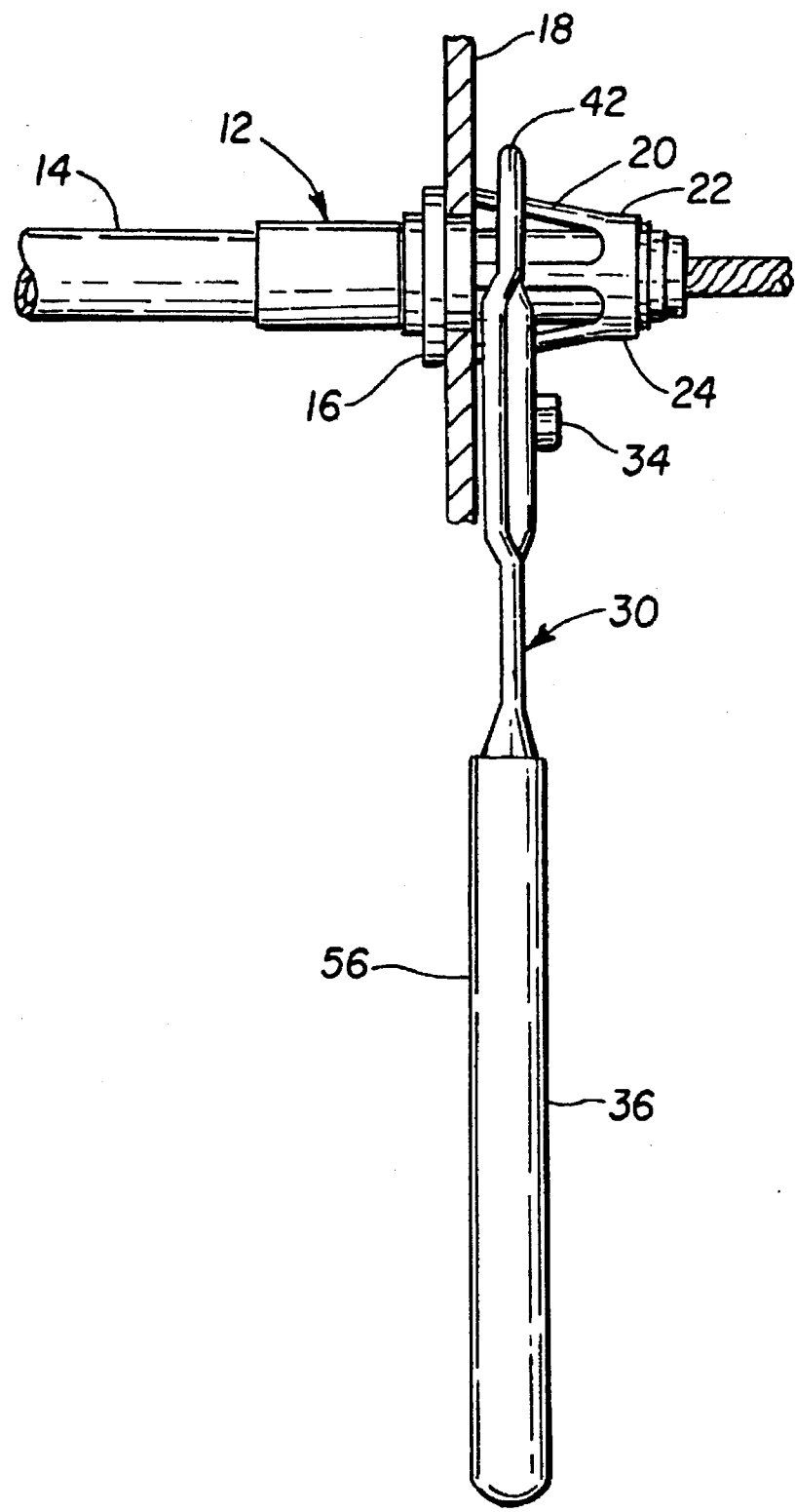
FIG. 3 is a side view in elevation of the spring retainer release tool shown in FIG. 2.

To release the flange and spring retainer assembly 12, the handle portions 36 and 38 of spring retainer release tool 10 are spread apart a sufficient distance to allow the respective jaw portions 40 and 42 to be placed around the extended fingers 20 of spring retainer 22, as best seen in FIGS. 2 and 3. Once the curved portions 44, 46 of the respective jaws 40, 42 are positioned over the extended fingers 20 of spring retainer 22, the handles 36, 38 can be squeezed together in the direction of the arrows 52, 54, so that the curved portions 44, 46 of the jaws 40, 42 operate to compress the fingers 20 against the mounting boss 28, which allows the flange and spring retainer assembly 12 to be withdrawn from the mounting bracket 18.

A significant advantage of the spring retainer release tool 10 according to the present invention is that the curved portions 44 and 46 of the respective jaws 40 and 42 allow for the simultaneous compression of the outwardly biased fingers 20 of spring retainer 22. The ability of the tool to simultaneously compress the fingers 20 makes it easy for a single operator to disengage the flange and spring retainer assembly 12 from the support bracket 18. Another advantage of the present invention is that the first and second levers 30 and 32 are adapted to open the respective jaws 40 and 42 a sufficient amount to allow the end portions 48 and 50 to clear the outwardly biased fingers 20, thus allowing for more convenient use of the tool 10.

Figure 4:
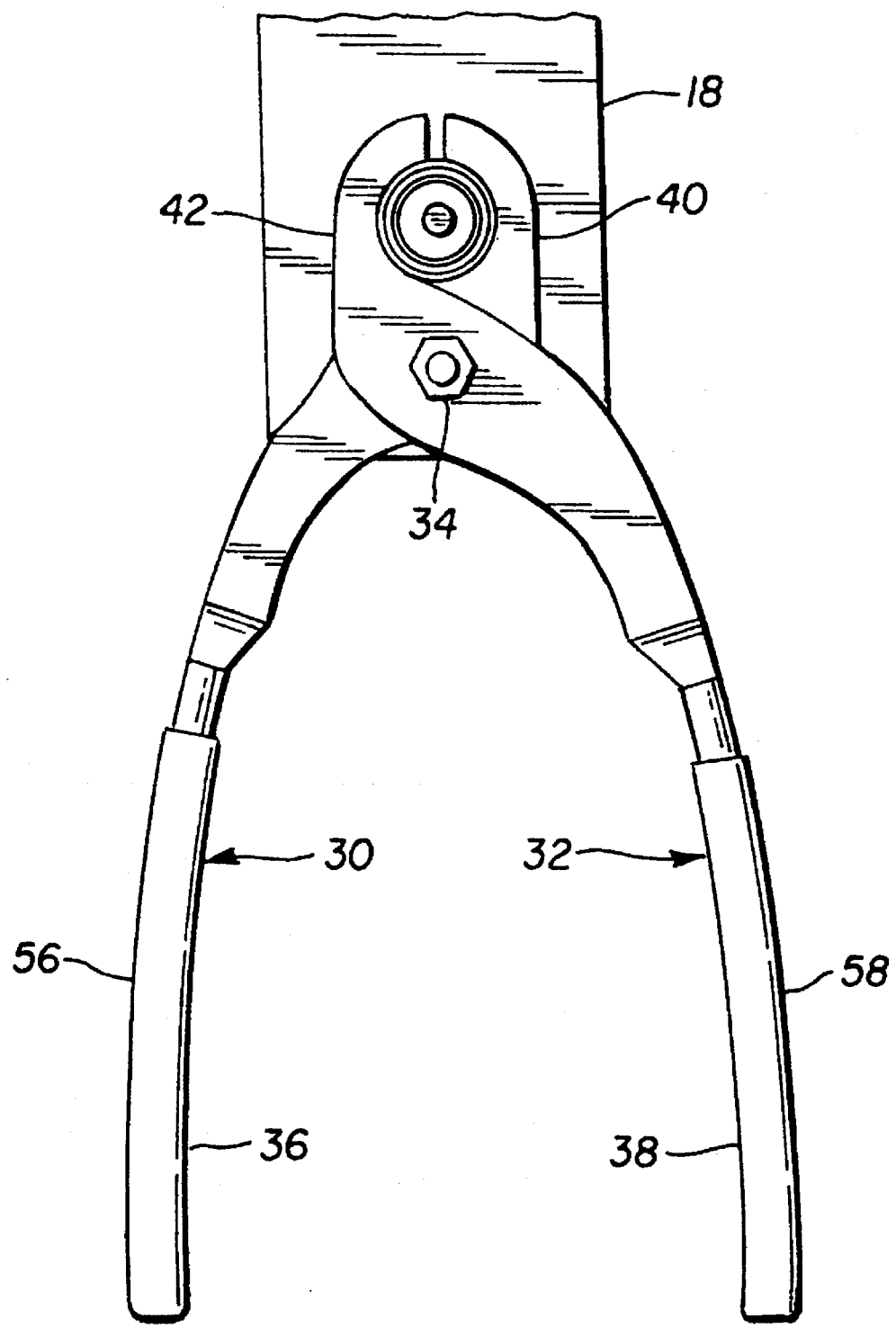
FIG. 4 is a front view of the spring retainer release tool compressing the fingers of a spring retainer.

The details of one embodiment of the spring retainer release tool 10 according to the present invention are best seen by referring to FIGS. 2–4 simultaneously. Essentially, the tool 10 comprises a first lever 30 mounted to a second lever 32 by a suitable mounting pivot, such a pivot pin or bolt assembly 34. Lever 30 may be made from steel or any other tough, strong material capable of withstanding the expected loads without failure. The bottom end of lever 30 includes a handle portion 36, while the top end includes a jaw portion 40. The handle portion 36 may optionally include a grip 56 that may be made from a wide variety of resilient materials, such as vinyl or rubber. Jaw portion 40 includes a curved portion 44 and a tip 48. The curved portion 44 of jaw 40 is adapted to engage the fingers 20 of spring retainer 22 and compress them against the mounting boss 28 to release the spring retainer in the manner described above. In one embodiment the curved portion 44 of jaw 40 defines a segment of a circle that has a radius of curvature that is about equal to the radius of curvature of the fingers 20 when they are in the compressed position, i.e., about the same as the radius of curvature of the circular support ring 22. The circular-shaped curved portion 44 allows for more the uniform compression of the fingers 20 against the mounting boss 28, as best seen in FIG. 4. Curved portion 44 may also have a smooth surface finish, although other surface finishes, such as a grooved or serrated surface finish (not shown) could be used as well.

The second lever 32 is similar to the first lever 30 and includes a handle portion 38 at the bottom end and a jaw portion 42 at the top end. Handle portion 38 may also include an optional grip 58. Jaw 42 includes a curved portion 46 and an end portion 50. The curved portion 46 of jaw 42 is also adapted to engage the fingers 20 of spring retainer 22 and compress them against the mounting boss 28 (FIG. 1). In one embodiment the second curved portion 46 of jaw 40 also defines a segment of a circle that has a radius of curvature about equal to the radius of curvature of the fingers 20 when they are in the compressed position. As was described above, such a circular configuration of the curved portions 44 and 46 allows for more even compression of fingers 20 against the mounting boss 28, enhancing tool operation and making it easier to disengage the spring retainer 22 from the mounting bracket 18. The curved portion 46 may also have a smooth surface finish or may have a serrated or grooved surface finish (not shown).

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. A method of releasing a spring retainer having a plurality of outwardly biased fingers, the fingers of the spring retainer being resiliently moveable from an extended position to a compressed position, comprising the steps of:

opening the jaws of a spring retainer release tool a sufficient distance so that they can be placed around the extended fingers of the spring retainer, the spring retainer release tool comprising a first lever and a second lever opposed thereto, each lever having a handle at the bottom end and a jaw at the top end, and an intermediate region at which the levers are hinged to each other by a pivot means about which the levers pivot, the jaw at the top end of said first lever having a curved portion and a tip portion, the jaw at the top end of said second lever having a curved portion and a tip portion;

simultaneously compressing the fingers of the spring retainer by moving together the handles of the spring retainer release tool to move the respective curved portions of the respective jaws of the first and second levers together; and urging the compressed fingers of the spring retainer through a mounting hole to release the spring retainer by moving the spring retainer and spring retainer release tool together.

* * * * *